United States Patent [19]
Scholz et al.

[11] Patent Number: 6,016,233
[45] Date of Patent: Jan. 18, 2000

[54] MAGNETIC TAPE APPARATUS WITH HOUSING IN WHICH PLAYBACK ELECTRONICS AND MAGNETIC TAPE IS PERMANENTLY DISPOSED

[75] Inventors: Werner Scholz, Gehrden; Werner Bachnick, Hannover; Wulf-Christian Streckenbach; Bernd Wessolly, both of Hemmingen; Walter Voessing, Hannover; Hartmut Peters, Barsinghausen; Ernst F. Schroeder, Hannover; Friedrich Timmermann, Garbsen, all of Germany; Paul-Louis Meunier, Paris; Max Artigalas, Le Chesnay, both of France

[73] Assignee: Deutsche Thomson-Brandt GmbH, Villingen-Schwenningen, Germany

[21] Appl. No.: 08/691,991

[22] Filed: Aug. 2, 1996

[51] Int. Cl.⁷ .......................................................... G11B 5/86
[52] U.S. Cl. .................................. 360/15; 360/8; 360/48; 360/74.1
[58] Field of Search ................................. 360/48, 22, 61, 360/63, 74.1, 15, 8, 93, 137, 94, 90, 132

[56] References Cited

U.S. PATENT DOCUMENTS

| | | | |
|---|---|---|---|
| 4,198,662 | 4/1980 | Schopper | 360/63 X |
| 5,274,506 | 12/1993 | Hashimoto et al. | 360/132 X |
| 5,371,634 | 12/1994 | Duurland et al. | 360/15 |
| 5,485,321 | 1/1996 | Leonhardt et al. | 360/48 |
| 5,572,378 | 11/1996 | Schwarz et al. | 360/63 X |

*Primary Examiner*—Andrew L. Sniezek
*Attorney, Agent, or Firm*—Oblon, Spivak, McClelland, Maier & Neustadt, P.C.

[57] ABSTRACT

A magnetic tape apparatus for the recording and reproduction of signals, including a magnetic tape having plural data tracks running parallel to an edge of the tape; a multi-track reading device including a multi-track playback head configured to read simultaneously plural of the tracks and output signals corresponding to data recorded on the plural tracks; and a housing in which the tape and the reading device are permanently disposed; wherein the tape is adapted for simultaneous recording of data onto plural data tracks of the tape via external recording heads upon the apparatus being connected to an external recording facility.

7 Claims, 4 Drawing Sheets

MAGNETIC TAPE APPARATUS WITH HOUSING IN WHICH PLAYBACK ELECTRONICS AND MAGNETIC TAPE IS PERMANENTLY DISPOSED

BACKGROUND OF THE INVENTION

1. Field of the Invention

The invention is based on a magnetic tape apparatus according to the precharacterizing clause of claim 1.

2. Discussion of the Background

It is known to record large quantities of digital data onto a magnetic tape at an extraordinarily high bit rate, i.e. in an extremely short time, by a matrix head see EP 89401125.3. Thanks to the matrix head, which makes possible the recording of a multiplicity of parallel tracks without guard bands, the same recording density can be achieved with a fixed head as in helical scan recording.

Since the relative speed between tape and head in longitudinal track recording with a multiplicity of parallel tracks is low, the scanning during playback has to take place with transducers which supply a speed-independent signal voltage. These are, for example, magnetoresistive heads, or heads which utilize the magnetooptical Kerr effect. A scanning device for a multiplicity of parallel tracks in which a laser beam is modulated by the magnetization of the adjacent tracks and is projected onto a CCD array, to be precise in such a way that each pixel of the CCD array receives the light modulated by the changes in magnetization of an individual track, is described in EP 89401125.3.

The number of pixels of the CCD array may also be greater than the number of simultaneously scanned tracks, so that an overscanning of the adjacent tracks takes place with the CCD array. By digital filtering, the signals of the individual tracks can then be separated, without exact tracking control being required. The coarse setting to a specific track region is made possible by the CCD array being designed such that it covers an enlarged track region, and the selection of the desired track region takes place using electronic means.

As a result, the accuracy requirements for the head displacement mechanism, required for the selection of different track regions, can be reduced significantly.

The signal voltage derived from the clock voltages of the CCD array represents the binary values of the adjacent bit cells in the parallel tracks. By suitable synchronizing information, the originally recorded signal can be restored using digital signal processing means.

SUMMARY OF THE INVENTION

Accordingly, one object of the invention is to provide a novel invention based on the object of utilizing these recording and reproduction possibilities for a handy magnetic tape apparatus. This object is achieved by magnetic tape apparatus for the recording and reproduction of signals, including a magnetic tape having plural data tracks running parallel to an edge of the tape; a multi-track reading device including a multi-track playback head configured to read simultaneously plural of the tracks and output signals corresponding to data recorded on the plural tracks; and a housing in which the tape and the reading device are permanently disposed; wherein the tape is adapted for simultaneous recording of data onto plural data tracks of the tape by means of external recording heads upon the apparatus being connected to an external recording facility.

The apparatus according to the invention is intended for the storage of very large quantities of sound signals which, after data reduction, are recorded as a digital signal. The apparatus is intended to be used as a portable playback device and, with dimensions which are only little larger than a commercially available magnetic tape cassette, to make it possible to access pieces of music equivalent to, for example, the content of about 200 CDs without changing the tape. The advantage of the apparatus according to the invention is that it is possible to record large quantities of data in an extremely short time, since with the matrix head, for example, 512 parallel tracks are recorded simultaneously, it being possible to transmit a very high bit rate for each individual track.

However, this high-speed recording can be carried out only with special external recording facilities, since the portable magnetic tape apparatus can neither generate the recording signal at the required bit rate nor supply the energy for the high-speed tape transport.

Therefore, it is necessary to provide users of the magnetic tape apparatuses according to the invention with the possibility of storing in their apparatus, for example, the content of a selection of CDs for a fee at special recording stations. With a data reduction, which still does not cause any notable loss in quality, the content of a CD can be accommodated on about 1.5 m of ¼" tape, so that for 200 CDs a tape length of about 300 m is required.

At a tape speed of 5 to 6 cm/s, recording onto the tape length required for the content of a CD of about 1.5 m takes less than 30 s. The signal of the CDs to be recorded is stored in a mass storage unit after data reduction, dividing into signal portions and resorting the time sequence of these portions. The resorting of the time sequence of the signal portions is required since the playback head scans in each case only some of all the parallel tracks, for example ⅛ of 512, i.e. 64 tracks. This reduces the requirements for the playback head and brings about a reduction of the data rate during playback. Such a simultaneously scanned track region is referred to later in this text as a macro track. The recording of the content of a CD in a limited tape region makes rapid access possible within a respective CD.

If the apparatus according to the invention is also equipped with its own matrix head for recording, apart from high-speed recording at the recording station it is also possible to perform own recordings in real time and recordings by copying from apparatus to apparatus. It is advisable to set the own recording head for the same number of tracks as the playback head. If, for example, both heads are set for 64 tracks, i.e. ⅛ of the tracks located on the tape, the copying from apparatus to apparatus takes 8 times as long as the high-speed recording at the external recording facility. The copy of a complete CD, including the return times required between the individual macro tracks, then takes about 5 min.

Since the tape speed during playback cannot be reduced at will, a start/stop mode of the tape is provided. The time-compressed signal portions scanned during this are converted with the aid of a buffer store into the continuous signal flow required for sound reproduction.

The recording in real time must likewise take place in start/stop mode. In this case, the buffer store serves for the time compression of the continuous sound signal, which is then recorded in separate time intervals.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

The invention is explained below with reference to the drawings, in which.

DETAILED DESCRIPTION OF THE PREFERRED EMBODIMENTS

Figure 1:
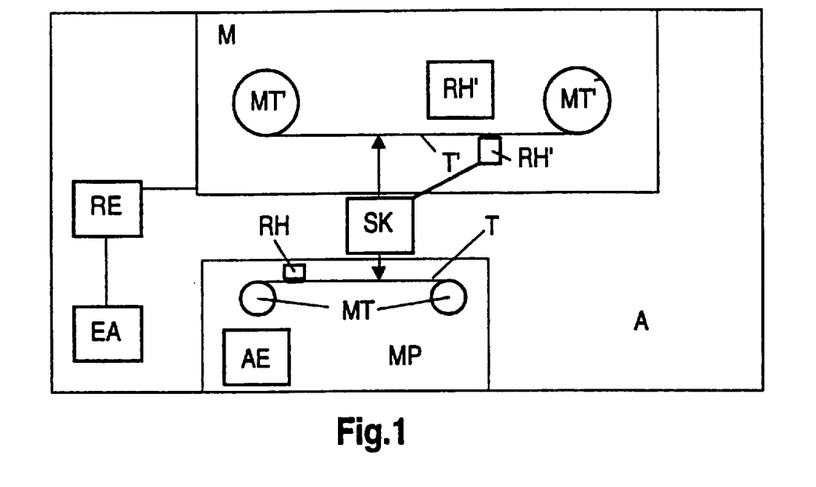
FIG. 1 shows the high-speed recording at the recording station.

Referring now to the drawings, wherein like reference numerals designate identical or corresponding parts throughout the several views, and more particularly to FIG. 1 thereof.

FIG. 1 shows a representation of the data transmission from an external recording facility to the magnetic tape apparatus MP according to the invention. The magnetic tape apparatus MP has a read head RH, a magnetic tape T and evaluation electronics AE. The recording facility A comprises recording electronics RE, a mass storage unit M, a read head RH', a magnetic tape T' and a write head SK.

The magnetic tapes are located on the tape hubs MT and MT', respectively. The magnetic tape T or T', respectively, moves in the longitudinal direction with respect to the write head SK. For recording onto the magnetic tape apparatus MP, it is introduced into the recording unit A. When playing back the magnetic tape T', the data pass via the read head RH' to the write head SK, which records the data onto the tape T moving in the longitudinal direction. Recording electronics RE control the data to be re-recorded and the quantity of data. The user can select the desired data beforehand by means of an input unit EA. After this operation, the magnetic tape apparatus MP can be removed. It is then possible to read out the data on the magnetic tape T with the aid of the read head by means of evaluation electronics AE.

Figure 2:
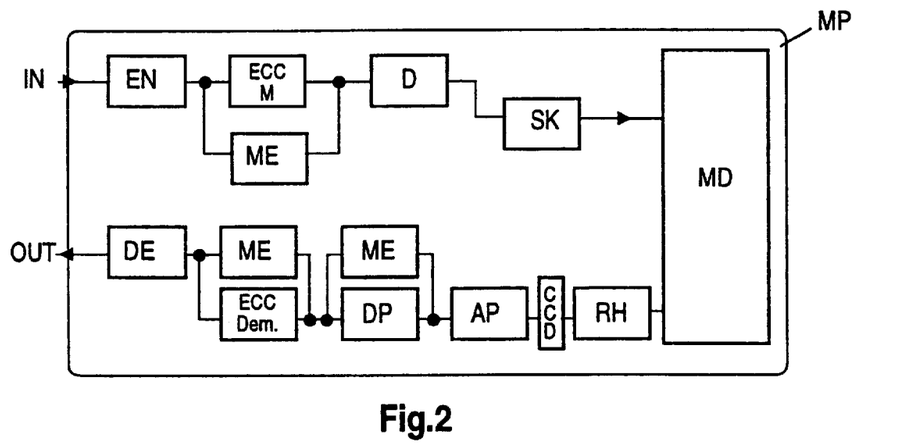
FIG. 2 shows a block diagram for the recording in real time.

FIG. 2 shows the magnetic tape apparatus MP according to the invention with its own recording electronics and own recording head for recording in real time. The input signal, which comes, for example, from the digital output of a CD player, is data-reduced in the encoder EN, for example by the MPEG method. By the error coding in the block ECC and a data multiplexing in the store ME, later error correction is made possible. Then, the signal is fed to the matrix head SK, serving for recording, via the head drivers D. During playback, the core head RH scans the parallel tracks of the tape. This involves laser light being modulated as a function of the magnetization in the tracks and projected onto a CCD array. The signal derived from the clock signals of the CCD array is converted back into the data-reduced recording signal after A/D conversion in the block AP through digital signal processing in the blocks DP and ME and error correction and demultiplexing in the blocks ECC and ME. With the aid of the decoding circuit DE, the original input data stream is restored from this recording signal.

Figure 3:
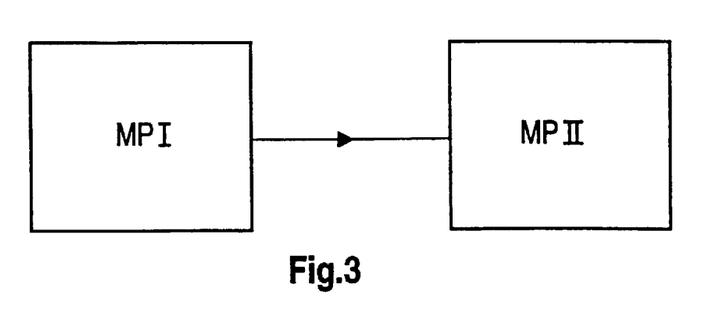
FIG. 3 shows a block diagram for the high-speed copying function

FIG. 3 shows the basic block diagram for re-recording from one magnetic tape apparatus MPI to the second magnetic tape apparatus MPII having the same recording format.

For the recording onto the magnetic tape apparatus MP there are various recording formats, which are described below.

In the reproduction of signals recorded on magnetic tape, it may be necessary to scan a recording which itself is continuous in short separate time intervals.

This case occurs, for example, if when scanning a longitudinal track recording with one or more parallel heads the relative movement between tape and heads must not fall below a certain speed value. The scanning-dependent bit rate may then be significantly higher than the bit rate required for the signal processing and signal evaluation.

The signal is supplied in a so-called time-compressed form and must be expanded for processing with the aid of a buffer store.

Owing to the limited storage size, in the case of signals of longer duration it is necessary to break them up into short, separate time intervals, the pause between the signal portions being determined by the processing speed.

For the scanning of the individual portions of a digital recording, it is necessary to meet, for example, the following two requirements:

1. The successive portions are to overlap one another, since, for reasons of signal assignment, the evaluable signal portions must begin and end with complete sync blocks and run-in regions are required for the stabilizing of the signal processing circuit.
2. The sync blocks must be consecutively numbered, in order that a double evaluation of sync blocks owing to the signal overlaps can be avoided.
3. The relative speed between head and tape is to be constant for the purpose of generating a constant scanning bit rate during the scanning of a portion.

Figure 4:
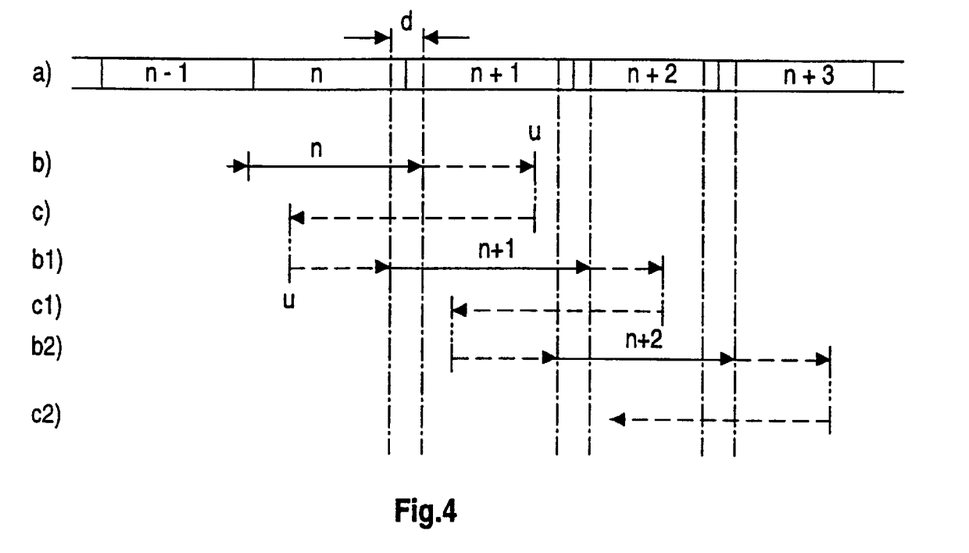
FIGS. 4–11 show scanning possibilities in the case of various recording formats.

FIG. 4 represents the relative movements between tape and scanning head which are to be carried out for the purpose of meeting the requirements. FIG. 4a shows the dividing of the tape recording into portions to be successively scanned. The overlaps are denoted by d. The arrows in lines b and c indicate the direction of the relative movements. The solid lines mark tape regions which are scanned at constant speed. The dashed lines represent relative movements at varying speed owing to acceleration or breaking. At the points of reversal of the direction of movement u, waiting times may be introduced for adapting the scanning operations to the data flow required for the signal processing.

Figure 5:
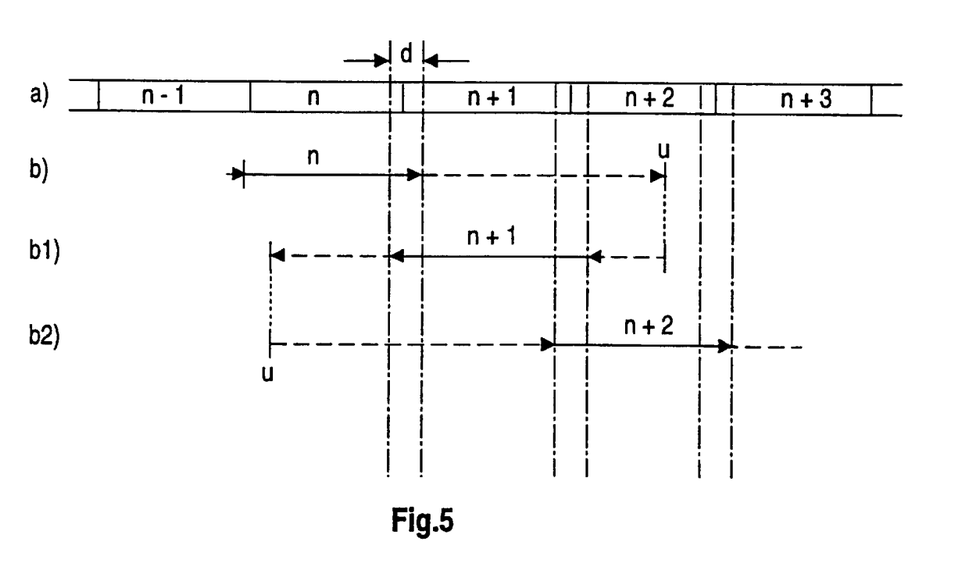

The scanning operation illustrated by FIG. 4 has the following disadvantages in comparison with continuous tape scanning:

1. Increased stressing, and consequently wearing, of the tape material and of the mechanism serving for generating the relative movement between tape and scanning head.
2. Increased energy consumption
3. Increased noise generation As FIG. 5 shows, the number of required movements back and forth between tape and head is halved by the alternating scanning of successive portions in opposite directions. Consequently, the effect of the disadvantages referred to is halved.

The signals from the portions scanned in the reverse direction may be brought into the correct sequence with the aid of a store in which writing and reading takes place in the opposite direction. This resorting expediently takes place in the playback circuit. The resorting could also take place before the recording. However, this would mean that the type of scanning is fixed, and so are the position and size of the portions.

On the other hand, a normal continuous recording can be divided into portions in any desired way during playback.

A development in which the division into portions during playback is predetermined by the recording format is presented below:

Apparatus for the magnetic recording and reproduction of information represented as digital data on a flat recording medium, preferably in tape form, in which the magnetic recording is applied in track form in the longitudinal direction of the medium on a plurality of N separate (macro) tracks, which each comprise for their part in turn M tracks processed together, the available data rate, to be determined from the tape speed v, the smallest usable wavelength 1, and the number K of simultaneously written or read tracks, being considerably higher than the data rate needed for the application (for example digital stereo sound).

EXAMPLE

| Width of medium a | 8 mm |
|---|---|
| Tape speed v | 60 mm/s |
| Bit length a | 0.0003 mm |
| Track width b | 0.01 mm |
| Number of tracks K | 64 |
| Number of macro tracks N | 8 |

This gives a gross data rate, usable over a relatively long time period, of $$R_0 = K*v/a = 64*60/0.0003 = 12.8 \text{ Mbit/s}.$$

By contrast, the data rate required for recording digital stereo sound (so-called CD format) is only $$R_1 = 2*44100*16 = 1.41 \text{ Mbit/s},$$

or even, with a data-reducing coding (for example according to ISO/IEC 11172-3, Layer II), only $R_2 = 256$ kbit/s.

As a consequence of this discrepancy, the recording and reproduction cannot take place in the form known per se of the continuous 'serpentine method'. This involves the recording or reproduction being carried out along a macro track from the beginning of the tape to the end of the tape, after which the recording means and reproduction means are positioned in a suitable way onto a further macro track and this is then processed in the reverse direction from the end to the beginning. Equally, it is possible to rewind the tape in the meantime and to carry out the processing in the further macro track likewise from the beginning to the end. However, the additional winding operation unnecessarily uses up energy, which in the case of a portable device, for example, is of great disadvantage.

On the other hand, both the difference between the gross data rate and the useful data rate and the simultaneous presence of N macro tracks give rise to the possibility of carrying out a recording or reproduction with high time compression. By continuous processing of one macro track alone, a time compression of up to $R_0/R_2$ can be achieved, utilizing N macro tracks up to $N*R_0/R_2$. With the values specified above, it is possible, for example, to bring the duration of a recording or reproduction of the music from a CD lasting 74 minutes in 'real time' to values below 30 seconds (additional data for error protection and transitional zones having to be taken into account).

Slower Speed

Firstly there is the possibility of reducing the tape speed in a way corresponding to the desired useful data rate. This is not recommendable, since on the one hand problems with friction and vibrations occur at low tape speeds, but on the other hand a certain time is also required in each case at the end of the tape for reversal, during which time the data are not continuously available. This could be compensated by buffering and briefly higher tape speed.

Intermittent Recording/Reproduction

The discrepancy between the gross data rate and the useful data rate leads directly to intermittent operation with buffer storage, for example in an alternating buffer or a continuous ring buffer. The gross data rate calculated above and an expedient size of such a buffer of, for example, 2 . . . 4 Mbits, give, for example, an expedient length of a single block on the magnetic tape of 6 mm, corresponding to a time duration of 0.1 sec and a data rate of 1.28 Mbit. This block may then correspond to the data for stereo sound with a real time of about 4 seconds. Intermittent operation thus means in each case alternating between 0.1 sec of active processing of a data block on the tape and about 3.9 sec of time for positioning to the logically following block, which does not have to be the physically following block. Various proposals for this logical arrangement can be offered for this.

Each block should carry a unique addressing, both the type of addressing and the playback function being preferably set up in such a way that the blocks can be identified even during high-speed tape running (winding forward and back). If reading and writing in both directions of tape running is intended, it may be expedient to provide the addressing data once at the beginning and once at the end of each block.

The various possibilities for a solution are presented below with reference to figures.

Version 1, Serpentine Mode

Figure 6:
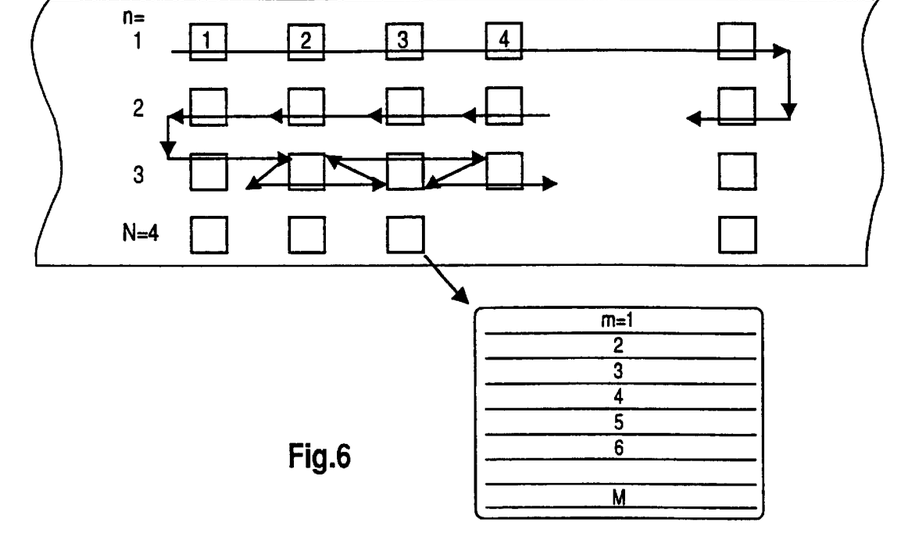

FIG. 6 shows first of all in diagrammatic form a piece of tape having N=4, macro tracks, which are in each case subdivided into short blocks, and between which transitional zones are provided. The length of these transitional zones is shown greatly exaggerated. For one block it is also shown that it is composed of M individual, parallel tracks in the longitudinal direction. Furthermore, the processing direction corresponding to the serpentine principle is also indicated. It can be seen immediately that intermittent operation can be accomplished only with considerable effort. If, for example, after the reading of block No. 1, lasting 0.1 sec, the tape running has to be stopped for 3.9 sec, then there either has to be provided correspondingly long transition zones, within which the tape running can stop and restart (shown in FIG. 6 in the case of macro track 2), or the tape has to be briefly rewound after each reading, in order that it is sure that the beginning of the following block can be read (shown in FIG. 6 in the case of macro track 3). This of course applies similarly for a recording process.

Version 2, Zigzag Mode

Figure 7:
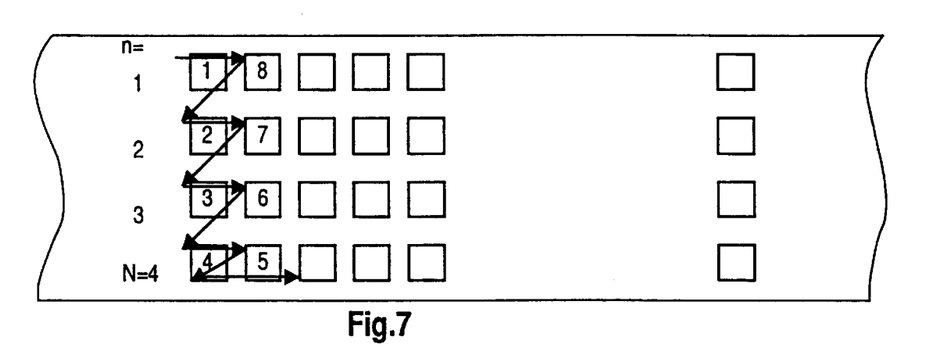

A further possible method is that, after every block, the tape is in each case wound back to such an extent that it is positioned again in front of the block, and then it is positioned (vertically) onto the following macro track. This is shown in FIG. 7.

Version 3, 'Minor' Serpentine Mode

Figure 8:
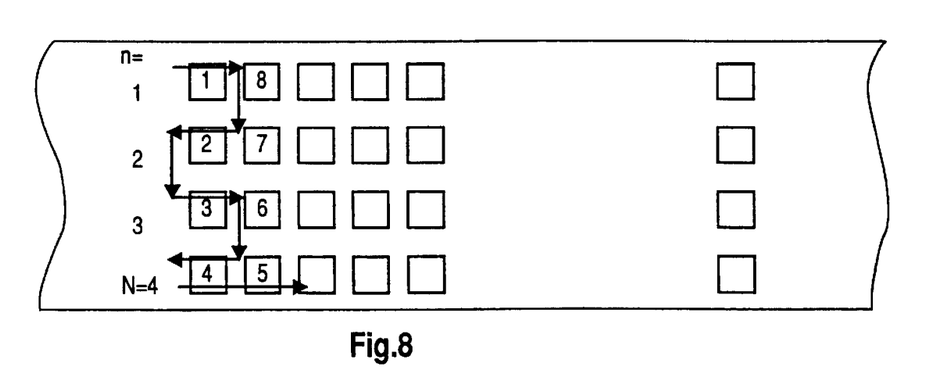

The number of positionings can be reduced if one uses so to speak a 'minor' serpentine mode (see FIG. 8). It can be seen immediately that there can be several versions with regard to the number of macro tracks and the handling at the lower and upper points of reversal. Shown is a version with an even number N, in which the first 'minor' serpentine (blocks 1 . . . 4) is advantageously followed directly by the next 'minor' serpentine (blocks 5 . . . 8).

Version 4, Continuous Serpentine Mode with Intermittent Operation

A yet further solution is to combine a uniform tape movement with intermittent recording or playback. This is first of all shown in FIG. 9. The tape-head movement is again indicated by arrows, and the respectively active blocks are marked by dots. Here too, a whole series of different versions are possible. What is important overall is that either the entire available tape length can be correspondingly processed, or that short pieces of tape can in each case be considered separately as a unit.

Figure 9:
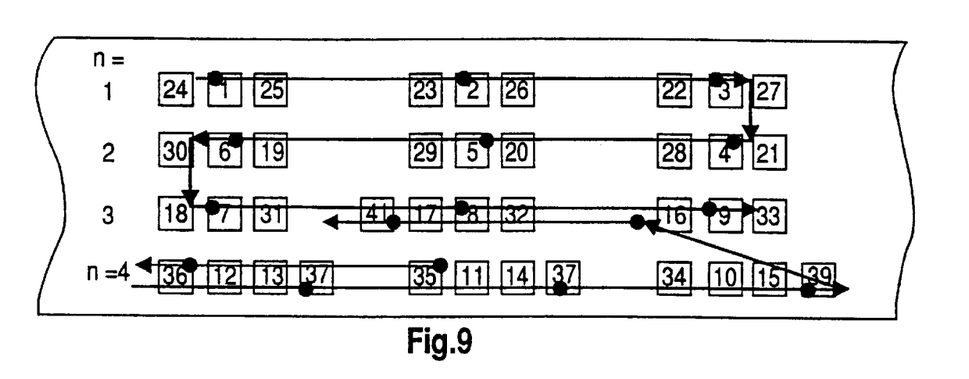

In FIG. 9 there is considered in each case a piece of tape which, with the parameters specified above, corresponds to a length of 3*4*60 mm=720 mm. The length of such a segment on the tape may be chosen, for example, to correspond to a specified value for a maximum positioning time.
Description of the Sequence for Different Operating Modes
High-speed Recording and/or Playback High-speed recording or playback can be achieved either over the entire width of the tape or within just one macro track if all the required data are available in a store, and if the scrambling of the blocks is performed within this store. In the case of this operating mode, the transitional zones can be kept very small.
Real-time Recording onto New or Erased Tape This is characterized by, in principle, continuous tape running, direction reversal after in each case a certain number of blocks, and the positioning of the next respective block on the basis of existing, already written blocks.

The recording begins at block 1. With continuous tape running, after the time fixed beforehand (here for example 3.9 sec) the position of block 2 is reached and the latter is written. After writing of block 3 (or one row further), the direction of tape running is reversed and positioning onto the next macro track takes place. If the tape running is restarted at the correct point in time, block 4 can be written approximately under block 3. This is repeated until the last block in the last macro track is reached (here block 12). Thereafter, only the direction of tape running is reversed and the following block (here 13) after the next readable block (here 12) in the direction of tape running is written. This can be continued correspondingly until the entire tape surface area is filled with blocks. Since each block is written after an already written block, a relatively long transitional zone is required on account of the tolerances in the absolute tape speed and the distance between the reading device (for positioning) and the writing device.
Real-time Playback Playback takes place in a corresponding way at continuous tape speed and by detecting the respectively logically following block. Here too, the increasing distance between the logically following blocks at the points of reversal has a disadvantageous effect. Finally, for example, the tape speed has to be increased at the points of reversal in order that the next logical block can be read in at the correct time.

It may, in addition, be expedient to make the first two blocks in each case of a sound recording (that is to say not only 1+2 but also, for example, 44+45) follow each other more closely, in order that it is certain that the data buffer is filled at the beginning of playback and does not run empty. It is also possible to compensate for this, however, by correspondingly higher tape speed, which is controlled by the buffer filling level.
Version 5

This is a development of version 4, which avoids the timing problems and the points of reversal.

This is characterized by the fact that, when recording for the first time, not only are the useful blocks written but also at the same time the blocks lying in between, with blank data but with the correctly specified address. At the respective end, not all the empty blocks but at least two more of them are written, and these can then be used for positioning in the following pass. Consequently, positioning for writing to each logical point is possible for every further pass, without increased lengths of the transitional regions being necessary to compensate for possible tolerances.

Figure 10:
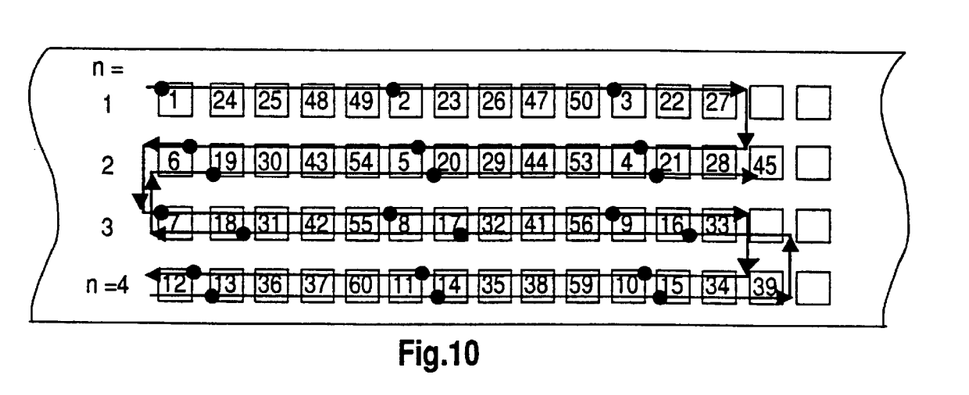

The sequence would be, for example, as follows (see FIG. 10); In the first pass, writing in the first macro track of blocks 1, 2, 3, writing of the blocks lying in between, blocks 24 . . . 49 and 23 . . . 50, respectively, with blank data and addresses, and at the end writing of the two blocks 22 and 27 with blank data and addresses.

After direction reversal and track positioning onto macro track 2, the two blocks 28 and 21 become empty and then block 4 is written with useful data. If the tape running is started at the correct time, these blocks lie approximately under 27, 22 and 3. This is continued up to block 12 at the end of macro track 4. Thereafter, only a direction reversal takes place.

In all the following writing operations, already written blocks can then be used respectively for positioning. Block 12 serves for positioning for block 13, block 11 for block 14, block 10 for block 15. Thereafter, a further empty block (39) after the existing empty block 34 is now written, in order that there are again two at the end. The already written empty block 33 is used for positioning for block 16.

In this way, in each track and for each direction there is always at least one block (empty or with useful data, but with the correct address) available which can be used for positioning for the respectively next block to be written. The time available for direction reversals and track switches is in the case of this proposal required additionally at most for the processing of 4 blocks. Consequently, no time problems can occur any longer at the ends of the tracks.
Version 6

Figure 11:
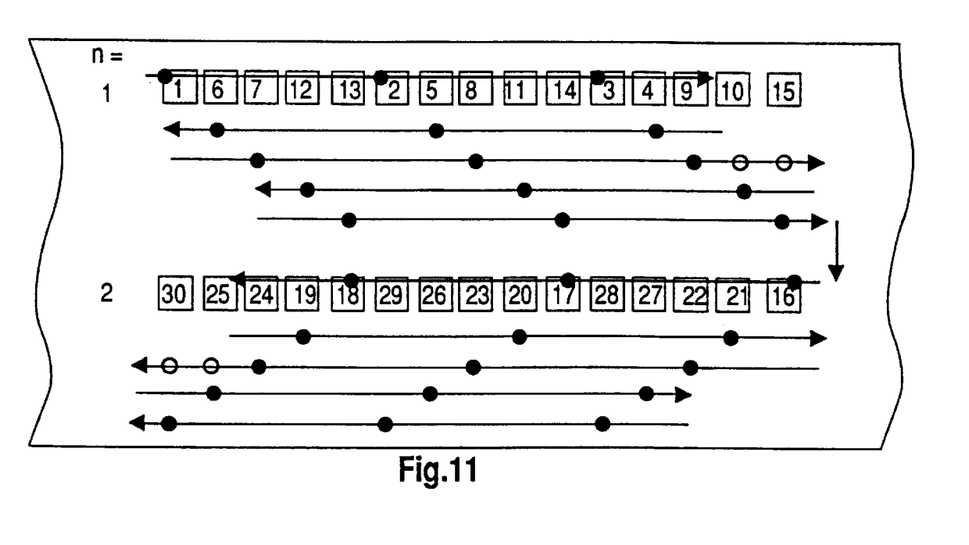

This version is a development of version 5, in which there is a further saving of energy by reducing the track positioning operations. This is characterized by the fact that one macro track is completely filled first of all before a further track is used. This is represented in FIG. 11.

It is again characterized by the fact that at the end of a track at least two empty blocks are written, which are used after direction reversal for positioning for the next writing operation.

It is easy to see that an uneven number of blocks (as shown) results in the writing/reading device being situated at the end of the track when the latter is entirely filled. Thereafter, the next track can be built up in the reverse direction (as shown). An even number of blocks results in the writing/reading device being situated back at the beginning of a track once it has been completely processed. Then, the next track can be built up in the same direction, whereupon a return is repeatedly made to the beginning of the piece of tape.

With an odd number of blocks, it is additionally also important whether the number of macro tracks is even or odd.

With an odd number of tracks, the writing/reading device is finally again situated at the end of the tape or piece of tape when the tape is completely filled, which may be advantageous for further writing or reading operations on following pieces of tape, but means a longer positioning time back to the beginning.

With an even number of tracks, the writing/reading device is finally again situated at the beginning of the tape when the tape is completely filled, which means a small positioning time to the beginning, but a longer pause for further processing of a following piece of tape.

The question as to where the writing/reading device is situated after the complete processing of a track is, however, of no great consequence if adequate time is available for positioning and for a winding forward and back operation. For continuous playback of the music recorded on a portion of tape, it may be advantageous if a continuous operation is also obtained in mechanical terms. For the case of an own real-time recording, the absolutely last pass could be omitted, trading off a small loss in storage space for the possibility of continuing directly on the next-following piece of magnetic tape.

The described version 6 additionally has the advantage that a 'moderately' high-speed recording, for example only using a 64-track head, can take place in a macro track manner, only the data required for this track having to be available for scrambling in a store in the recording unit.

It follows from the statements made above that, for SDCR-Audio Album, the described version 6 should expediently be used. The number of blocks and number of tracks are even here. Overall, several formats can be defined:

Format for High-speed Recording with Data Reduction

Here, the blocks are provided in the individual tracks in a way corresponding to FIG. 11. The distances between the blocks can be kept as small as is required for direct complete recording and a sequential reading operation.

According to the parameters specified above, 6×40 blocks of a length of 6 mm could be accommodated on a piece of tape 6'24 cm long. This would give a playing time of 16 min per track and altogether N'16 min.

Format for Own Recording with Data Reduction

In own recording, the procedure as described for version 6 would have to be followed. Since safety intervals are respectively required for positioning, erasing and recording and run-in sequences are also required for the PLL, altogether less blocks can be accommodated per track. With otherwise the same tape running, it would be possible, for example, to accommodate only 6'30 blocks of the same length of 6×24 cm. The own recording would then lead to a shortening of the recording duration per piece of tape, but with in principle the same tape running.

Format for Own Recording Without Data Reduction

Without data reduction, i.e. in the 16-bit CD format, data quantities higher by about a factor of 6 can be accommodated. This can be achieved in turn with in principle the same tape running by a closer sequence of the blocks following logically one after the other on the tape. If, above, a new block has to be written or read every 4 sec, here it is then every 4/6 sec. That is to say that the blocks logically belonging together are no longer 24 cm apart from one another, but only 4 cm. With safety intervals with respect to the neighbouring blocks, then no longer 30, but for example 5, can be accommodated.

With otherwise the same tape running, the recording duration is thus shortened correspondingly by the factor of the data reduction.

FURTHER FORMATS

The proposed form of continuous tape movement, together with the intermittent writing and reading operation, can be readily adapted to further data formats and rates.

What is claimed and desired to be secured by Letters Patent of the United States is:

1. A magnetic tape apparatus for the recording and reproduction of signals, comprising:

a magnetic tape having plural data tracks running parallel to an edge of the tape;

a multi-track reading device including a multi-track playback head configured to read simultaneously plural of said tracks and output signals corresponding to data recorded on said plural tracks; and a housing in which said tape and said reading device are permanently disposed;

wherein said tape is adapted for simultaneous recording of data onto plural data tracks of said tape by means of external recording heads that record information in said plural data tracks when said apparatus is connected to an external recording facility containing the external heads.

2. The apparatus according to claim 1, wherein with the external recording heads all the signal tracks intended for the tape are recorded simultaneously.

3. The apparatus according to claim 1 or 2, wherein the multi-track playback head reads in each case only some of the tracks located on the tape and is set to various track regions.

4. The apparatus according to claim 3, further comprising an internal recording head, which can record simultaneously only some of the signal tracks intended for the tape and which is set to various track regions.

5. The apparatus according to claim 3, wherein in the case of reproduction and/or recording in real time the tape runs in start/stop mode.

6. The apparatus according to claim 5, further comprising a buffer store for the expansion or compression of recorded data with respect to time.

7. The apparatus according to claim 1, wherein the parallel tracks are recorded in different writing and reading directions.

* * * * *

UNITED STATES PATENT AND TRADEMARK OFFICE
CERTIFICATE OF CORRECTION

PATENT NO. : 6,016,233
DATED : January 18, 2000
INVENTOR(S) : Werner Scholz et al.

It is certified that error appears in the above-identified patent and that said Letters Patent is hereby corrected as shown below:

Title page,
Item [30], Foreign Application Priority Data has been omitted.
It should read as follows:

-- [30] Foreign Application Priority Data
Aug. 23, 1995   [DE]   Germany...................195 31 075 --

Signed and Sealed this

Eleventh Day of December, 2001

Attest:

NICHOLAS P. GODICI
*Attesting Officer*   Acting Director of the United States Patent and Trademark Office